(No Model.)

H. GARWICK.
GAMBREL.

No. 482,633. Patented Sept. 13, 1892.

Witnesses
Jesse Heller
Philip C. Masi

Inventor
Harrison Garwick
by E. W. Anderson
his Attorney

UNITED STATES PATENT OFFICE.

HARRISON GARWICK, OF MORRISON, ILLINOIS.

GAMBREL.

SPECIFICATION forming part of Letters Patent No. 482,633, dated September 13, 1892.

Application filed February 29, 1892. Serial No. 423,224. (No model.)

*To all whom it may concern:*

Be it known that I, HARRISON GARWICK, a citizen of the United States, residing at Morrison, in the county of Whiteside and State of Illinois, have invented certain new and useful Improvements in Gambrels; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
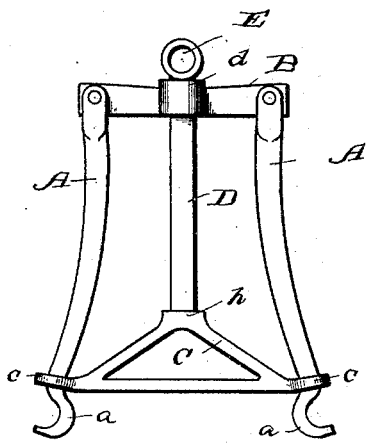
Figure 2:
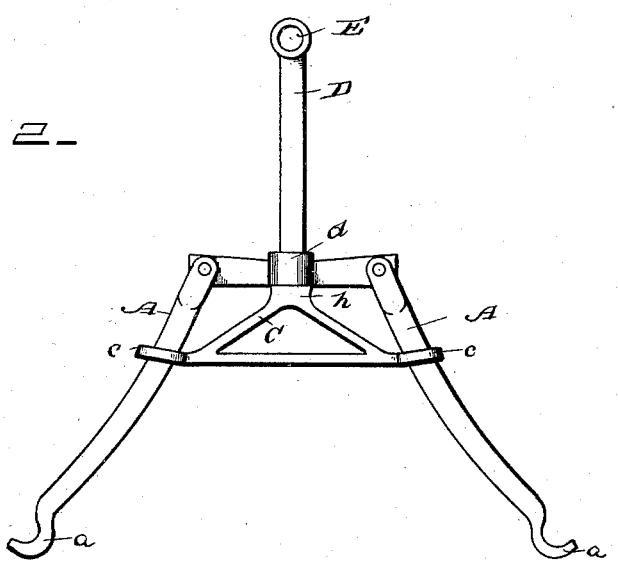

Figure 1 of the drawings is a view of the invention closed. Fig. 2 is a view of same expanded.

This invention has relation to certain new and useful improvements in gambrels; and it consists in the novel construction and combination of parts, as hereinafter specified.

In the accompanying drawings, the letters A A designate a pair of arms formed with hooks *a a* at their lower ends and connected at their upper ends by means of a cross-head B, the ends of which are pivoted in slots or bifurcations in the ends of the arms.

C designates a yoke-piece having eyes *c* at each end, through which the arms A A loosely pass. Said yoke-piece has connected to its central portion a vertical arm or stem D, which passes loosely through an aperture *d* in the central portion of the cross-head B. At the upper end of said arm or stem is an eye E, to which the rope or other suspension medium is designed to be attached.

This device is intended to take the place of the crooked stick or arms commonly employed by butchers and others in suspending animals which have been slaughtered for the purpose of dressing, weighing, &c.

When the arms A A are raised, as shown in Fig. 1, with the yoke-piece near the lower or hooked extremities, the device may be easily applied. When raised by the ordinary suspending device, the weight of the animal draws said arms downward through the yoke, suspending and distending the animal in such a manner as to be convenient for the operation of dressing, &c. The yoke is usually formed with a shoulder or bearing at *h* for the head B.

Having described this invention, what I claim as new, and desire to secure by Letters Patent, is—

The herein-described gambrel, comprising the arms A A, having hooks at their lower extremities, the cross-head to which said arms are pivoted at their upper portions, the transverse yoke-piece C, having eyes at its extremities through which said arms loosely pass, and the arm or stem D, connected to the central portion of said yoke-piece and passing loosely through an aperture in the central portion of the cross-head, substantially as specified.

In testimony whereof I affix my signature in presence of two witnesses.

HARRISON GARWICK.

Witnesses:
L. T. STOCKING,
THOMAS GUFFIN.